US012601922B2

(12) United States Patent
Modavis

(10) Patent No.: US 12,601,922 B2
(45) Date of Patent: Apr. 14, 2026

(54) WAVEGUIDES WITH ENHANCED MODAL DENSITIES

(71) Applicant: CORNING INCORPORATED, Corning, NY (US)

(72) Inventor: Robert Adam Modavis, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 19/089,083

(22) Filed: Mar. 25, 2025

(65) Prior Publication Data

US 2025/0328018 A1      Oct. 23, 2025

Related U.S. Application Data

(60) Provisional application No. 63/636,268, filed on Apr. 19, 2024.

(51) Int. Cl.
*G02B 27/01* (2006.01)
*G02B 6/30* (2006.01)
*G02B 6/34* (2006.01)

(52) U.S. Cl.
CPC ........... *G02B 27/0172* (2013.01); *G02B 6/30* (2013.01); *G02B 6/34* (2013.01); *G02B 27/0176* (2013.01); *G02B 2027/0123* (2013.01); *G02B 2027/0152* (2013.01)

(58) Field of Classification Search
CPC .............. G02B 27/017; G02B 27/0172; G02B 27/0176; G02B 6/30; G02B 6/34; G02B 2027/0123; G02B 2027/0152
See application file for complete search history.

(56) References Cited

U.S. PATENT DOCUMENTS

| | | | |
|---|---|---|---|
| 7,742,674 B2 | 6/2010 | Mossberg et al. | |
| 8,615,148 B2 | 12/2013 | Chen et al. | |
| 2003/0152352 A1* | 8/2003 | Starodubov | G02B 6/02104 385/128 |
| 2004/0177694 A1* | 9/2004 | Harrold | G01L 11/04 73/702 |
| 2007/0104443 A1* | 5/2007 | Helmy | H04L 12/12 385/129 |

(Continued)

FOREIGN PATENT DOCUMENTS

WO      2023/113984 A1      6/2023

OTHER PUBLICATIONS

Chilwell et al., "Thin-films field-transfer matrix theory of planar multilayer waveguides and reflection from prism-loaded wave-guides," J. Opt. Soc. Am. A/vol. 1, No. Jul. 7, 1984, 12 pages.

(Continued)

*Primary Examiner* — Cory A Almeida
(74) *Attorney, Agent, or Firm* — Yiqun Zhao

(57) ABSTRACT

A device for projecting a virtual- or augmented-reality image may include a waveguide and an in-coupler directing light into the waveguide such that the light is propagated through the waveguide via total internal reflection. The waveguide may include a core, a substrate, and a stack of thin films overlaying a surface of the core. A refractive index of at least one of the thin films of the stack may differ from that of the core. Adjacent thin films may have different refractive indices from one another.

18 Claims, 9 Drawing Sheets

(56) References Cited

U.S. PATENT DOCUMENTS

| | | | |
|---|---|---|---|
| 2008/0050078 A1* | 2/2008 | Digonnet | G02B 6/02376 |
| | | | 385/125 |
| 2009/0153852 A1* | 6/2009 | Rensen | G01J 3/02 |
| | | | 356/300 |
| 2017/0235142 A1 | 8/2017 | Wall et al. | |
| 2019/0056591 A1 | 2/2019 | Tervo et al. | |
| 2019/0094458 A1* | 3/2019 | Ohara | A61B 1/0653 |
| 2019/0196098 A1* | 6/2019 | Yang | G02B 1/04 |
| 2020/0301240 A1* | 9/2020 | Ziemkiewicz | G02F 1/295 |
| 2024/0069248 A1* | 2/2024 | Mahmoud | G02B 6/34 |

OTHER PUBLICATIONS

International Search Report and Written Opinion of the International Searching Authority; PCT/US2025/021248; dated Jun. 27, 2025; 11 pages; European Patent Office.

* cited by examiner

WAVEGUIDES WITH ENHANCED MODAL DENSITIES

This application claims the benefit of priority of U.S. Provisional Application Ser. No. 63/636,268 filed on Apr. 19, 2024, the content of which is relied upon and incorporated herein by reference in its entirety.

FIELD

Aspects of the present disclosure generally relate to optical elements, more particularly, multimode waveguides, and to optical devices, such as optical head-mounted displays.

BACKGROUND

Weight reduction is an important consideration for optical head-mounted displays, such as augmented reality (AR), virtual reality (VR), and/or mixed reality (MR) (collectively XR) devices. Certain weight requirements need to be achieved in order to realize headsets with XR capabilities that do not result in excessive fatigue for the user. Waveguides, such as step-index, planar waveguides, are used in grating based XR devices. The waveguides can be made from high index glasses which can be beneficial for increasing the field of view (FOV), but high index glasses can have relatively high densities, thereby increasing device weight. However, incorporating materials with a lower index (and typically, lower density) with a thinner high index glass may reduce the overall weight of the waveguide, but the resultant mode spacing of the waveguide can be coarse when the high index glass is thin, which in turn can result in a reduction in the resolution of the image to unacceptable levels. Thus, there is a need for improved waveguides for use in optical head-mounted displays or XR devices with reduced weight without compromising the performance attributes.

SUMMARY

Described herein are waveguides and devices incorporating a waveguide. The waveguide described herein may include a planar waveguide and may include a coating on at least one of the major surfaces of the waveguide. The coating may be configured such that a greater number/density of modes may be supported by the waveguide when compared to a waveguide having a comparable or even greater thickness but no coating. The waveguide may also allow the devices incorporating the waveguide, such as a grating-based AR, VR, or MR device, to provide improved resolution while reducing the overall weight of the device.

In some embodiments, a device for projecting a virtual- or augmented-reality image may include a waveguide and an in-coupler directing light into the waveguide such that the light is propagated through the waveguide via total internal reflection. The waveguide may include a core, a substrate having a thickness greater than or equal to 20 µm and less than or equal to 600 µm, and a stack of thin films overlaying a surface of the core. The stack may include at least three thin films overlaying one another in the stack. The stack may have a thickness less than 50 µm. A refractive index of at least one of the thin films may differ from that of the core. Adjacent thin films may have different refractive indices from one another.

In some embodiments, a head-mounted device may include a display, a waveguide, an in-coupler, and an out-coupler. The in-coupler may be configured for coupling light emitted by the display into the waveguide at a first location of the waveguide such that the light is propagated through the waveguide via total internal reflection to a second location of the waveguide. The out-coupler may be configured for coupling the light out of the waveguide at the second location of the waveguide and for projecting the light into a user's eye. The waveguide may include a core and a coating. The core may include a first major surface, a second major surface opposite the first major surface, and a thickness defined by a distance between the first major surface and the second major surface. The thickness of the core may be less than or equal to 2,000 µm. The coating may include a thickness that is less than or equal to 50 µm, a first layer disposed on the first major surface of the core and having a first refractive index that may be different from the refractive index of the core, and a second layer disposed on the first layer and having a second refractive index that may be different from the first refractive index of the first layer. The propagation of the light through the waveguide via total internal reflection satisfies the following: $\kappa_1 h - \emptyset_c - \emptyset_s = m$, where $\kappa_1 = n_1 k \cos \theta$, $n_1$ is the refractive index of the core, $k = 2\pi/\lambda$, $\lambda$ is the wavelength of the light, $\theta$ is an incidence angle of the light propagating inside the core of the waveguide via internal reflection, h is the thickness of the core, $\emptyset_c$ represents a phase change of the light upon reflection from the first major surface of the core, and $\emptyset_s$ represents a phase change of the light upon reflection from the second major surface of the core, and m is an integer and specifies a mode number associated with the incidence angle $\theta$. The coating may be configured such that $$\left| \frac{d\emptyset_c}{d\theta} \right|$$

may be greater relative to that of the core without the coating.

In some embodiments, a waveguide for transporting a virtual- or augmented-reality image may include a core and a coating disposed on the first major surface of the core. The core may include a first major surface, a second major surface opposite the first major surface, and a thickness defined by a distance between the first major surface and the second major surface. The thickness of the core may be greater than or equal to 5 µm and less than or equal to 2,000 µm. The coating may include a first layer disposed on the first major surface of the core and having a first refractive index less than or equal to 1.6 and different from the refractive index of the core, a second layer disposed on the first layer and having a second refractive index greater than or equal to 1.6 and different from the first refractive index of the first layer, and a third layer disposed on the second layer and having a third refractive index less than or equal to 1.6 and different from the second refractive index of the second layer. A thickness of the coating may be greater than or equal to 1 nm and less than or equal to 50 µm. Propagation of light through the waveguide via total internal reflection satisfies the following: $\kappa_1 h - \emptyset_c - \emptyset_s = m\pi$, where $\kappa_1 = n_1 k \cos \theta$, $n_1$ is the refractive index of the core, $k = 2\pi/\lambda$, $\lambda$ is the wavelength of the light, $\theta$ is an incidence angle of the light propagating through the waveguide via internal reflection, h is the thickness of the core, $\emptyset_c$ represents a phase change of the light upon reflection from the first major surface of the core, and $\emptyset_s$ represents a phase change of the light upon reflection from the second major surface of the core, and m is an integer and specifies a mode number associated with the incidence angle θ. The coating may be configured such that $$\left|\frac{d\phi_c}{d\theta}\right|$$

may be greater relative to that of the core without the coating.

These and other aspects, objects, and features of the present disclosure will be understood and appreciated by those skilled in the art upon studying the following specification, claims, and appended drawings.

DETAILED DESCRIPTION

Figure 1:
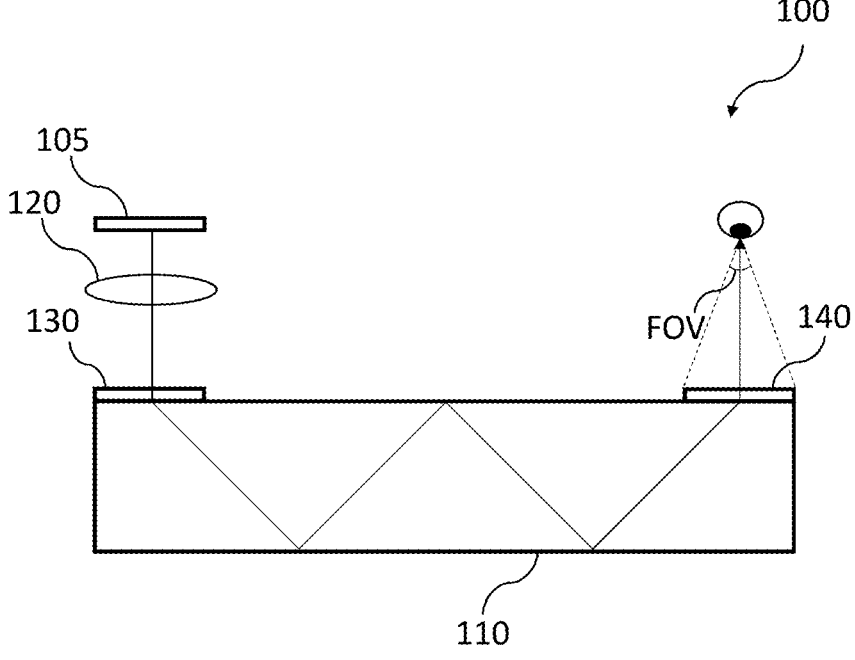
FIG. 1 schematically illustrates a device incorporating a waveguide.

In the following detailed description, for purposes of explanation and not limitation, example embodiments disclosing specific details are set forth to provide a thorough understanding of various principles of the present disclosure. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Unless otherwise expressly stated, it is not intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is not intended that an order be required. This holds for any possible non-express basis for interpretation, including: matters of logic with respect to arrangement of steps or operational flow; plain meaning derived from grammatical organization or punctuation; the number or type of embodiments described in the specification.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

In this disclosure, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In this specification and in the claims that follow, reference will be made to a number of terms which shall be defined to have the following meanings.

"Include," "includes," or like terms means encompassing but not limited to, that is, inclusive and not exclusive.

The indefinite article "a" or "an" and its corresponding definite article "the" as used herein means at least one, or one or more, unless specified otherwise.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "formed from" means one or more of comprises, consists essentially of, or consists of. For example, a component that is formed from a particular material can comprise the particular material, consist essentially of the particular material, or consist of the particular material.

As used herein, contact refers to direct contact or indirect contact. Direct contact refers to contact in the absence of an intervening material and indirect contact refers to contact through one or more intervening materials. Elements in direct contact touch each other. Elements in indirect contact do not touch each other, but are otherwise joined or coupled to each other through one or more intervening elements. Elements in contact may be rigidly or non-rigidly joined. Contacting refers to placing two elements in direct or indirect contact. Elements in direct (indirect) contact may be said to directly (indirectly) contact each other.

The terms "atop," "on," "disposed atop," or "disposed on" refer to direct or indirect contact. If one layer is referred to herein as being atop, on, disposed atop, or disposed on another layer, the two layers are in direct or indirect contact. The terms "directly atop," "directly on," or "directly disposed atop," or "directly disposed on" means that the two layers are in direct contact.

FIG. 1 schematically illustrates a device 100, such as an optical head-mounted display (OHMD) 100 which may include an AR, VR, or MR device, in operation. The device 100 may include a waveguide 110. Light (or optical information, such as an image) projected from a light-emitting element or display 105, such as a microdisplay 105, is passed through a collimating lens 120 and coupled into the waveguide 110 by an in-coupler 130 such that the light can be propagated by the waveguide via, e.g., total internal reflection. After cycles of total internal reflections inside the waveguide 110, the light is coupled out of the waveguide 110 by an out-coupler 140 into a user's eye. Non-limiting example of in-coupler 130 and out-coupler 140 may include prisms, mirrors, surface relief gratings, volume holographic gratings, polarization volume gratings, metasurface-based couplers, etc. In some embodiments, the light-emitting element 105, the collimating lens 120, and the waveguide 110 may all be incorporated into the device 100 and form an integrated unit.

It should be noted that although only one ray of light is shown in FIG. 1 having an incident angle of 0 degrees for purpose of illustration, the collimated light from the microdisplay 105 after passing through the collimating lens 120 may have a range of incident angles. However, not all light incident on the waveguide 110 may be propagated by the waveguide 110 from the in-coupler 130 to the out-coupler 140. This is because only certain modes of propagation can be supported by each waveguide, depending on the particular design of the waveguide.

Some OHMDs, such as grating-based AR devices, currently utilize a high index (e.g., n=2.0) glass waveguide having a thickness of about 800 μm and bounded by air on both sides. Because of the high index and high thickness of the waveguide, relatively small mode spacing (or high modal density), which determines the maximum resolution possible for image transport, can be achieved to enable an image resolution of about 2 arc minutes across the field of view (FOV) at the out-coupler of the device (see FIG. 1). When thinner waveguides are used, the mode spacing becomes larger. When a lower index material is incorporated, such as a thin waveguide supported on a glass substrate with a relative low index (e.g., n=1.5), the mode spacing becomes even larger. Increased mode spacing can significantly and adversely impact the resolution of the image formed in the viewer's eye from the light output by the waveguide.

Embodiments of waveguides described herein may include a multilayer coating applied to one or both major surfaces of the core of the waveguide such that the mode spacing can be reduced or compressed, which in turn lead to improved image resolution. The multilayer coating may be configured such that greater angular dependence of the phase of light reflected from a coated major surface of the core/waveguide can be achieved, when compared to a bare waveguide without the multilayer coating. Stated differently, the multilayer coating applied to at least one of the major surfaces of the waveguide may alter the modal spectrum of a relative thin waveguide such that the mode spacing is reduced and the modal density is increased, thereby enabling a relatively thin waveguide to transport images with higher fidelity while reducing the weight of the device incorporating the waveguide.

Figure 2:
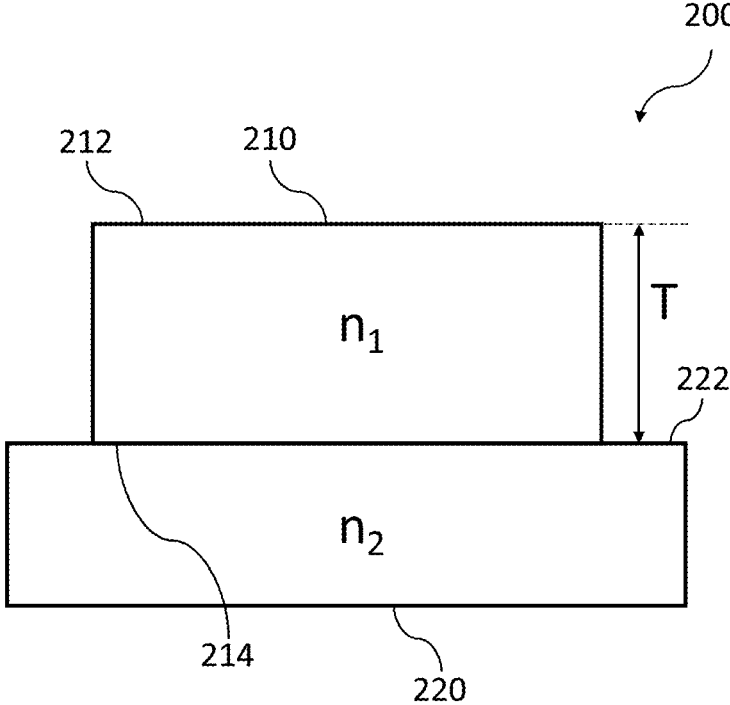
FIG. 2 schematically illustrates an exemplary waveguide.

FIG. 2 schematically illustrates (not to scale) an exemplary waveguide 200. In some embodiments, the waveguide 200 may include a planar waveguide. In some embodiments, the waveguide 200 may include a step index waveguide. The waveguide 200 may include a guiding component 210 disposed on a substrate 220. In some embodiments, the guiding component 210 may include a single layer 210 having a homogenous composition. The guiding component 210 may include a first refractive index $n_1$. The substrate 220 may include a second refractive index $n_2$ that is different from, such as less than, the first refractive index $n_1$ of the guiding component 210.

The guiding component 210 may include a first major surface 212, a second major surface 214 opposite the first major surface 212, and a thickness T defined by the distance between the first major surface 212 of the guiding component 210 and the second major surface 214 of the guiding component 210. The first major surface 212 of the guiding component 210 may be exposed to air. The second major surface 214 of the guiding component 210 may be in direct contact with a major surface 222 of the substrate 220.

Figure 3A:
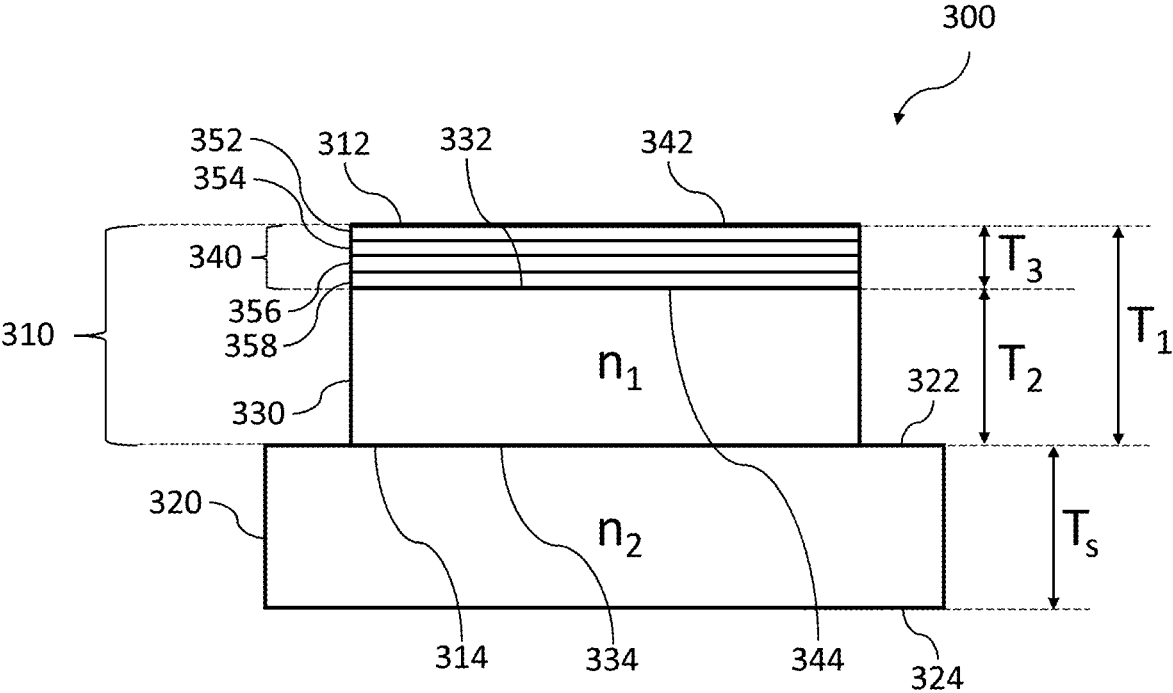
FIG. 3A schematically illustrates another exemplary waveguide.

FIG. 3A schematically illustrates (not to scale) an exemplary waveguide 300. In some embodiments, the waveguide 300 may include a planar waveguide. In some embodiments, the waveguide 300 may include a step index waveguide. The waveguide 300 may include a guiding component 310 disposed on a substrate 320. In some embodiments, the substrate 320 may be omitted, and the waveguide 300 may not include the substrate 320.

The guiding component 310 may include a first major surface 312, a second major surface 314 opposite the first major surface 312, and a thickness $T_1$ defined by the distance between the first major surface 312 and the second major surface 314. The first major surface 312 may be exposed to air and form an exterior surface of the waveguide 300. The second major surface 314 may be in direct contact with a first major surface 322 of the substrate 320.

Different from the guiding component 210 of the waveguide 200 shown in FIG. 2, which includes a single-layer structure, the guiding component 310 of the waveguide 300, in some embodiments, may include a core 330 and a coating 340. In some embodiments, such as in the embodiment shown in FIG. 3A, the core 330 may be disposed between the substrate 320 and the coating 340. In other words, the substrate 320 and the coating 340 may be disposed on opposite sides of the core 330.

The core 330 may include a first major surface 332, a second major surface 334, and a thickness $T_2$ defined by the distance between the first major surface 332 and the second major surface 334. The first major surface 332 of the core 330 may be in direct contact with the coating 340. The second major surface 334 of the core 330 may be in direct contact with the first major surface 322 of the substrate 320. Thus, the second major surface 334 of the core 330 may correspond to the second major surface 314 of the guiding component 310.

In some embodiments, the thickness $T_2$ of the core 330 may be greater than or equal to 5 μm and less than or equal to 2,000 µm—including all sub-ranges or values therebetween. In some embodiments, the thickness $T_2$ of the core 330 may be greater than or equal to 5 µm, greater than or equal to 25 µm, greater than or equal to 50 µm, greater than or equal to 75 µm, greater than or equal to 100 µm, greater than or equal to 200 µm, greater than or equal to 300 µm, greater than or equal to 400 µm, greater than or equal to 500 µm, greater than or equal to 600 µm, greater than or equal to 700 µm, greater than or equal to 800 µm, greater than or equal to 900 µm, greater than or equal to 1,000 µm, greater than or equal to 1,500 µm, greater than or equal to 2,000 µm, or greater. In some embodiments, the thickness $T_2$ of the core 330 may be less than or equal to 2,000 µm, less than or equal to 1,500 µm, less than or equal to 1,000 µm, less than or equal to 900 µm, less than or equal to 800 µm, less than or equal to 700 µm, less than or equal to 600 µm, less than or equal to 500 µm, less than or equal to 400 µm, less than or equal to 300 µm, less than or equal to 200 µm, less than or equal to 100 µm, less than or equal to 75 µm, less than or equal to 50 µm, or less than or equal to 25 µm, or less.

The core 330 may include a single-layer structure, which may include a material layer having a homogenous or substantially homogenous composition. The core 330 may include a first refractive index $n_1$. In some embodiments, the first refractive index $n_1$ may be greater than or equal to 1.6 and less than or equal to 2.6—including all sub-ranges or values therebetween. The refractive index of each layer/material described herein refers to the refractive index of that layer/material at the wavelength of 632.8 nm, unless otherwise specified.

In some embodiments, the first refractive index $n_1$ of the core 330 may be greater than or equal to 1.6, greater than or equal to 1.7, greater than or equal to 1.8, greater than or equal to 1.9, greater than or equal to 2.0, greater than or equal to 2.1, greater than or equal to 2.2, greater than or equal to 2.3, greater than or equal to 2.4, greater than or equal to 2.5, or greater than or equal to 2.6, or greater. In some embodiments, the first refractive index $n_1$ of the core 330 may be less than or equal to 2.6, less than or equal to 2.5, less than or equal to 2.4, less than or equal to 2.3, less than or equal to 2.2, less than or equal to 2.1, less than or equal to 2.0, less than or equal to 1.9, less than or equal to 1.8, less than or equal to 1.7. In some embodiments, the core 330 may include a single-layer structure, which may include a material layer having a homogenous or substantially homogenous composition. Non-limiting exemplary material forming the core 330 may include glass, plastic, or any other suitable materials that may be sufficiently transparent to the light to be propagated by the waveguide.

In some embodiments, the substrate 320 may include a second refractive index $n_2$ that is different from, such as less than, the first refractive index $n_1$ of the core 330. In some embodiments, the second refractive index $n_2$ of the substrate 320 may be greater than or equal to 1.3 and less than or equal to 1.8—including all sub-ranges or values therebetween. In some embodiments, the second refractive index $n_2$ of the substrate 320 may be less than or equal to 1.8, less than or equal to 1.7, less than or equal to 1.6, less than or equal to 1.5, less than or equal to 1.4, or less than or equal to 1.3, or less. In some embodiments, the second refractive index $n_2$ of the substrate 320 may be greater than or equal to 1.3, greater than or equal to 1.4, greater than or equal to 1.5, greater than or equal to 1.6, greater than or equal to 1.7, or greater. In some embodiments, the substrate 320 may include a single-layer structure, which may include a material layer having a homogenous or substantially homogenous composition.

Non-limiting exemplary material forming the substrate 320 may include glass, plastic, or any other suitable materials.

The substrate 320 may further include a second major surface 324 opposite the first major surface 322, and a thickness $T_s$ defined by the distance between the first major surface 322 and the second major surface 324 of the substrate 320. The second major surface 324 may be exposed to air. In some embodiments, the thickness $T_s$ of the substrate 320 may be greater than or equal to 20 µm and less than or equal to 1,500 µm—including all sub-ranges or values therebetween. In some embodiments, the thickness $T_s$ of the substrate 320 may be greater than or equal to 20 µm, greater than or equal to 25 µm, greater than or equal to 50 µm, greater than or equal to 100 µm, greater than or equal to 200 µm, greater than or equal to 300 µm, greater than or equal to 400 µm, greater than or equal to 500 µm, greater than or equal to 600 µm, greater than or equal to 700 µm, greater than or equal to 800 µm, greater than or equal to 900 µm, greater than or equal to 1,000 µm, greater than or equal to 1,100 µm, greater than or equal to 1,200 µm, greater than or equal to 1,300 µm, greater than or equal to 1,400 µm, greater than or equal to 1,500 µm, or greater. In some embodiments, the thickness $T_s$ of the substrate 320 may be less than or equal to 1,500 µm, less than or equal to 1,400 µm, less than or equal to 1,300 µm, less than or equal to 1,200 µm, less than or equal to 1,100 µm, less than or equal to 1,000 µm, less than or equal to 900 µm, less than or equal to 800 µm, less than or equal to 700 µm, less than or equal to 600 µm, less than or equal to 500 µm, less than or equal to 400 µm, less than or equal to 300 µm, less than or equal to 200 µm, less than or equal to 100 µm, less than or equal to 75 µm, less than or equal to 50 µm, or less than or equal to 25 µm, or less.

The substrate 320 may improve the structural integrity of the waveguide 300 when a relatively thin core 330 may be utilized, such as when the thickness of the core 330 may be less than or equal to 200 µm. In some embodiments, the waveguide 300 may not include the substrate 320.

The coating 340 may include a first major surface 342, a second major surface 344, and a thickness $T_3$ defined by the distance between the first major surface 342 and the second major surface 344 of the coating 340. The thickness $T_1$ of the guiding component 310 may include a combination of the thickness $T_2$ of the core 330 and the thickness $T_3$ of the coating 340. The first major surface 342 of the coating 340 may be exposed to the air. Thus, the coating 340 may also be referred to as the exterior coating 340. The first major surface 342 of the coating 340 may correspond to the first major surface 312 of the guiding component 310. The second major surface 344 of the coating 340 may directly contact the first major surface 332 of the core 330.

In some embodiments, the coating 340 may include a multilayer stack having two or more layers (or a stack of thin films) with each layer (or thin film) having a refractive index different from adjacent layer(s) (or film(s)). In some embodiments, the multilayer stack may include high (relative as compared to adjacent layer(s)) index layers 352, 356 and low (relative as compared to adjacent layer(s)) index layers 354, 358 arranged in an alternating matter. In some embodiments, a low index layer 358 of the multilayer stack may directly contact the core 330 and form the second major surface 344 of the coating 340. In some embodiments, a high index layer (not shown) may directly contact the core 330 and form the second major surface 344 of the coating 340. In some embodiments, a high index layer 352 may be exposed to the air and form the first major surface 342 of the coating 340. In some embodiments, a low index layer (not shown) may be exposed to the air and form the first major surface 342 of the coating 340. In some embodiments, the refractive indices of the high index layers 352, 356 may be the same. In some embodiments, the refractive indices of the low index layer 354, 358 may be the same. In some embodiments, the refractive index of each of the high index layers 352, 356 may be greater than the refractive index of each of the low index layers 354, 358.

Figure 3B:
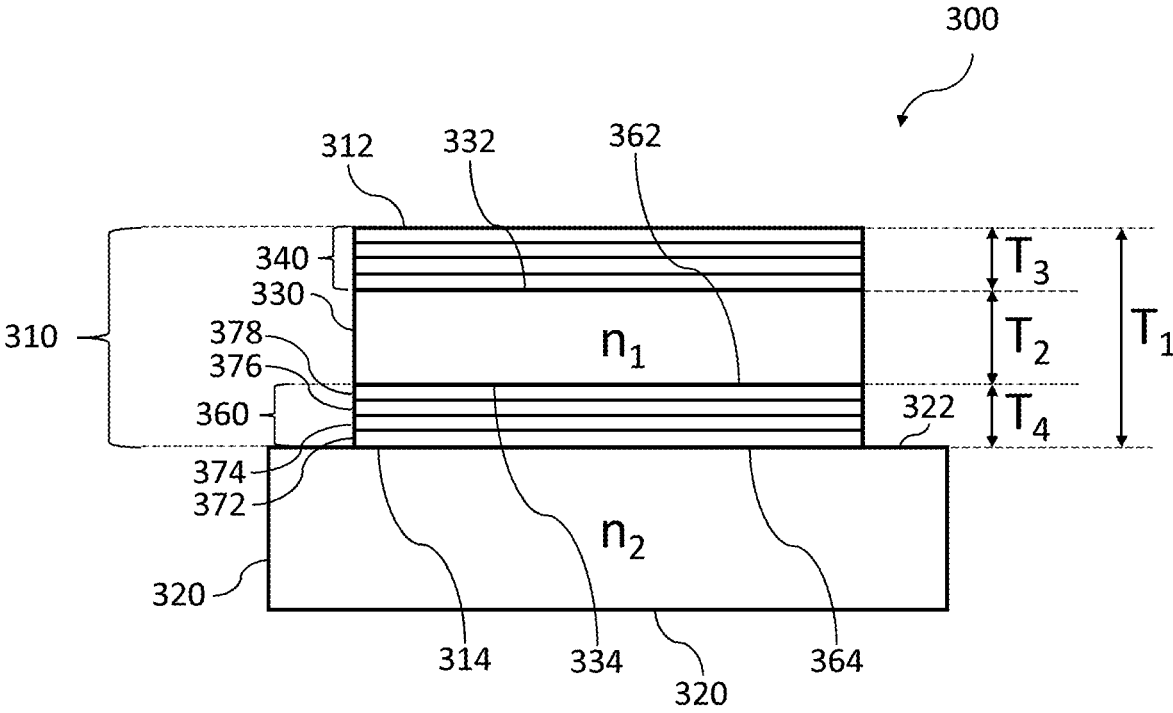
FIG. 3B schematically illustrates another exemplary waveguide.

In some embodiments, such as shown in FIG. 3B, the guiding component 310 may further include another coating 360 disposed between the core 330 and the substrate 320. The coating 360 may include a first major surface 362, a second major surface 364, and a thickness $T_4$ defined by the distance between the first major surface 362 and the second major surface 364 of the coating 360. The thickness $T_1$ of the guiding component 310 may include a combination of the thickness $T_2$ of the core 330, the thickness $T_3$ of the coating 340, and the thickness $T_4$ of the coating 360. The first major surface 362 of the coating 360 may directly contact the second major surface 334 of the core 330. The second major surface 364 of the coating 360 may directly contact the first major surface 322 of the substrate 320. Thus, the second major surface 364 of the coating 360 may correspond to the second major surface 314 of the guiding component 310. The coating 360 may also be referred to as the interior coating 360.

In some embodiments, the coating 360 may include a multilayer stack having two or more layers (or a stack of thin films) with each layer (or thin film) having a refractive indices different from adjacent layer(s) (or film(s)). In some embodiments, the multilayer stack may include high (relative as compared to adjacent layer(s)) index layers 372, 376 and low (relative as compared to adjacent layer(s)) index layers 374, 378 arranged in an alternating matter. In some embodiments, a low index layer 378 of the multilayer stack may directly contact the core 330 and form the first major surface 362 of the coating 360. In some embodiments, a high index layer (not shown) may directly contact the core 330 and form the first major surface 362 of the coating 360. In some embodiments, a high index layer 372 may directly contact the substrate 320 and form the second major surface 364 of the coating 360. In some embodiments, a low index layer (not shown) may directly contact the substrate 320 and form the second major surface 364 of the coating 360. In some embodiments, the refractive indices of the high index layers 372, 376 may be the same. In some embodiments, the refractive indices of the low index layer 374, 378 may be the same. In some embodiments, the refractive index of each of the high index layers 372, 376 may be greater than the refractive index of each of the low index layers 374, 378.

Figure 3C:
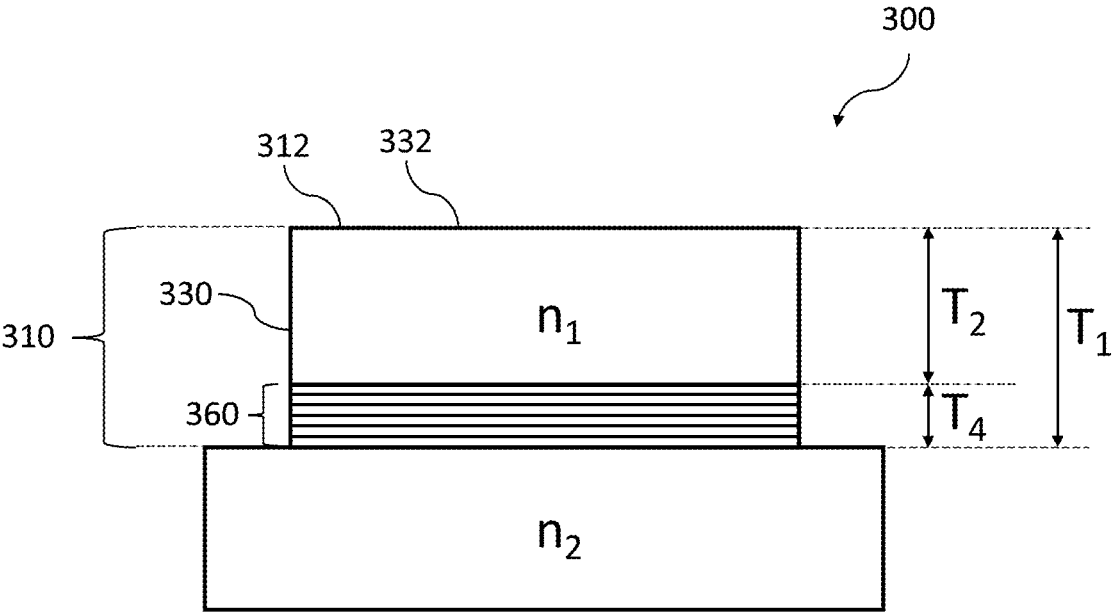
FIG. 3C schematically illustrates another exemplary waveguide.

In some embodiments, the guiding component 310 may not include the exterior coating 340, and may only include the interior coating 360, such as shown in FIG. 3C. The first major surface 332 of the core 330 may correspond to the first major surface 312 of the guiding component 310. The thickness $T_1$ of the guiding component 310 may include a combination of the thickness $T_2$ of the core 330 and the thickness $T_4$ of the coating 360.

In some embodiments, the high index layers described herein may each have a refractive index that may be greater than or equal to 1.6, greater than or equal to 1.7, greater than or equal to 1.8, greater than or equal to 1.9, greater than or equal to 2.0, greater than or equal to 2.1, greater than or equal to 2.2, greater than or equal to 2.3, greater than or equal to 2.4, greater than or equal to 2.5, or greater than or equal to 2.6.

In some embodiments, the high index layers described herein may each have a refractive index that may be greater than or equal to 1.6 and less than or equal to 2.6—including all sub-ranges or values therebetween. For example, in some embodiments, the high index layers described herein may each have a refractive index that may be greater than or equal to 1.6 and less than or equal to 2.6, greater than or equal to 1.6 and less than or equal to 2.5, greater than or equal to 1.6 and less than or equal to 2.4, greater than or equal to 1.6 and less than or equal to 2.3, greater than or equal to 1.6 and less than or equal to 2.2, greater than or equal to 1.6 and less than or equal to 2.1, greater than or equal to 1.6 and less than or equal to 2.0, greater than or equal to 1.6 and less than or equal to 1.9, greater than or equal to 1.6 and less than or equal to 1.8, greater than or equal to 1.6 and less than or equal to 1.7, greater than or equal to 1.7 and less than or equal to 2.6, greater than or equal to 1.7 and less than or equal to 2.5, greater than or equal to 1.7 and less than or equal to 2.4, greater than or equal to 1.7 and less than or equal to 2.3, greater than or equal to 1.7 and less than or equal to 2.2, greater than or equal to 1.7 and less than or equal to 2.1, greater than or equal to 1.7 and less than or equal to 2.0, greater than or equal to 1.7 and less than or equal to 1.9, greater than or equal to 1.7 and less than or equal to 1.8, greater than or equal to 1.8 and less than or equal to 2.6, greater than or equal to 1.8 and less than or equal to 2.5, greater than or equal to 1.8 and less than or equal to 2.4, greater than or equal to 1.8 and less than or equal to 2.3, greater than or equal to 1.8 and less than or equal to 2.2, greater than or equal to 1.8 and less than or equal to 2.1, greater than or equal to 1.8 and less than or equal to 2.0, greater than or equal to 1.8 and less than or equal to 1.9, greater than or equal to 1.9 and less than or equal to 2.6, greater than or equal to 1.9 and less than or equal to 2.5, greater than or equal to 1.9 and less than or equal to 2.4, greater than or equal to 1.9 and less than or equal to 2.3, greater than or equal to 1.9 and less than or equal to 2.2, greater than or equal to 1.9 and less than or equal to 2.1, greater than or equal to 1.9 and less than or equal to 2.0, greater than or equal to 2.0 and less than or equal to 2.6, greater than or equal to 2.0 and less than or equal to 2.5, greater than or equal to 2.0 and less than or equal to 2.4, greater than or equal to 2.0 and less than or equal to 2.3, greater than or equal to 2.0 and less than or equal to 2.2, greater than or equal to 2.0 and less than or equal to 2.1, greater than or equal to 2.1 and less than or equal to 2.6, greater than or equal to 2.1 and less than or equal to 2.5, greater than or equal to 2.1 and less than or equal to 2.4, greater than or equal to 2.1 and less than or equal to 2.3, greater than or equal to 2.1 and less than or equal to 2.2, greater than or equal to 2.2 and less than or equal to 2.6, greater than or equal to 2.2 and less than or equal to 2.5, greater than or equal to 2.2 and less than or equal to 2.4, greater than or equal to 2.2 and less than or equal to 2.3, greater than or equal to 2.3 and less than or equal to 2.6, greater than or equal to 2.3 and less than or equal to 2.5, greater than or equal to 2.3 and less than or equal to 2.4, greater than or equal to 2.4 and less than or equal to 2.6, greater than or equal to 2.4 and less than or equal to 2.5, or greater than or equal to 2.5 and less than or equal to 2.6.

In some embodiments, the low index layers described herein may each have a refractive index that may be less than or equal to 1.6, less than or equal to 1.5, less than or equal to 1.4, or less than or equal to 1.3.

In some embodiments, the low index layers described herein may each have a refractive index that may be greater than or equal to 1.3 and less than or equal to 1.6—including all sub-ranges or values therebetween. For example, in some embodiments, the low index layers described herein may each have a refractive index that may be greater than or equal to 1.3 and less than or equal to 1.6, greater than or equal to 1.3 and less than or equal to 1.5, greater than or equal to 1.3 and less than or equal to 1.4, greater than or equal to 1.4 and less than or equal to 1.6, greater than or equal to 1.4 and less than or equal to 1.5, greater than or equal to 1.5 and less than or equal to 1.6. In some embodiments, the low index layers described herein may each have a refractive index that may be greater than or equal to 1.3, greater than or equal to 1.4, greater than or equal to 1.5, greater than or equal to 1.6, or greater. In some embodiments, the low index layers described herein may each have a refractive index that may be less than or equal to 1.6, less than or equal to 1.5, less than or equal to 1.4, less than or equal to 1.3, or less.

In some embodiments, the high index layers within the same coating layer stack, such as the exterior coating 340 or the interior coating 360, may have a common refractive index value. In some embodiments, the high index layers in both the exterior and interior coatings may have the same refractive index value. In some embodiments, at least one of the high index layers of a coating layer stack may have a different refractive index value from the other one or more high index layers of the same coating layer stack. In some embodiments, at least one of the high index layers of one coating layer stack may have a refractive index value different from the refractive index value of at least one of the high index layers of the other coating layer stack.

In some embodiments, the low index layers within the same coating layer stack may have a common refractive index value. In some embodiments, the low index layers in both the exterior and interior coatings may have the same refractive index value. In some embodiments, at least one of the low index layers of a coating layer stack may have a different refractive index value from the other one or more low index layers of the same coating layer stack. In some embodiments, at least one of the low index layers of one coating layer stack may have a refractive index value different from the refractive index value of at least one of the low index layers of the other coating layer stack.

When the high index layers may have different refractive index values and/or when the low index layers may have different refractive index values, one or more of the high index layers may include refractive index value(s) that may be less than the refractive index value(s) of non-adjacent low index layer(s) of the same or different coating layer stacks.

Although examples having high index layers and low index layers arranged in an alternating matter are described with reference to FIGS. 3A, 3B, and 3C, in some embodiments, the refractive indices of the various layers of the multilayer stack may not be alternating. In these embodiments, the refractive index of each layer may simply be different from adjacent layer(s). For example, in some embodiments, a layer may have a refractive index value greater than the refractive index value of one of the two adjacent layers but less than the refractive index value of the other one of the two adjacent layers.

In some embodiments, each of the high index layers may include a homogenous or substantially homogeneous material composition. In some embodiments, the high index layers within the same coating layer stack may include a common material or composition. In some embodiments, at least one of the high index layers may include a different material or composition from the other one or more high index layers of the same coating layer stack. In some embodiments, the high index layers in both the exterior and interior coatings may have the same material or composition. In some embodiments, one or more of the high index layers in one coating may have different materials or compositions from one or more of the high index layers in the other coating.

In some embodiments, each of the low index layers may include a homogenous or substantially homogeneous material composition. In some embodiments, the low index layers within the same coating layer stack may include a common material or composition. In some embodiments, at least one of the low index layers may include a different material or composition from the other one or more low index layers of the same coating layer stack. In some embodiments, the lower index layers in both the exterior and interior coatings may have the same material or composition. In some embodiments, one or more of the low index layers in one coating may have different materials or compositions from one or more of the low index layers in the other coating.

Depending on the layer arrangement within each coating layer stack, in some embodiments, a material may form a high index layer (relative to an adjacent layer) in one coating layer stack while the same material layer may form a low index layer (relative to an adjacent layer) in a different coating layer stack. Similar, a material may form a high index layer (relative to an adjacent layer) in one portion of a coating layer stack while the same material layer may form a low index layer (relative to an adjacent layer) in a different portion of the same coating layer stack. Non-limiting exemplary materials forming the various layers in the coating layer stack may include $Al_2O_3$, $Cr_2O_3$, $HfO_2$, $In_2O_3$, ITO, $Nb_2O_5$, $Pr_2O_3$, $Sc_2O_3$, $SiO_2$, $SiO$, $Ta_2O_5$, $TiO_2$, $Y_2O_3$, $ZrO_2$, $AlF_3$, $CaF_2$, $CeF_3$, $LaF_3$, $MgF_2$, $ThF_4$, $YF_3$, etc.

Although each coating 340, 360 is shown to include two high index layers and two low index layers in FIGS. 3A, 3B, and 3C for purpose of illustration, it should be noted that each coating 340, 360 may include any suitable number of high and low index layers (or thin films). In some embodiments, the coating 340, 360 may each include at least 3 layers of thin films with adjacent layers having different refractive index values. In some embodiments, the total number of the layers (or high and low index layers) in each coating 340, 360 may be greater than or equal to 3 and less than or equal to 500—including all sub-ranges or values therebetween. In some embodiments, the total number of thin films (or high and low index layers) in each coating 340, 360 may be greater than or equal to 3, greater than or equal to 4, greater than or equal to 5, greater than or equal to 6, greater than or equal to 7, greater than or equal to 8, greater than or equal to 9, greater than or equal to 10, greater than or equal to 20, greater than or equal to 30, greater than or equal to 40, greater than or equal to 50, greater than or equal to 100, greater than or equal to 250, or greater than or equal to 500. In some embodiments, the total number of the thin films in each coating 340, 360 may be less than or equal to 500, less than or equal to 250, less than or equal to 100, less than or equal to 50, less than or equal to 40, less than or equal to 30, less than or equal to 20, less than or equal to 10, less than or equal to 9, less than or equal to 8, less than or equal to 7, less than or equal to 6, less than or equal to 5, less than or equal to 4, or less than or equal to 3.

In some embodiments, the total number of thin films (or high and low index layers) of the coating 340, 360 may be less than or equal to 200 or less than or equal to 100 so as to prevent deformation of the core 330 and/or the substrate 320 which may occur due to the amount of stress the coating 340, 360 may exert on the core 330 and/or the substrate 320.

In some embodiments, the thickness of each layer (e.g., high index layers 352, 356, 372, 376 and/or low index layers 354, 358, 374, 378) may be greater than or equal to 1 nm and less than or equal to 25,000 nm—including all sub-ranges or values therebetween. In some embodiments, the thickness of each layer may be greater than or equal to 1 nm, greater than or equal to 5 nm, greater than or equal to 10 nm, greater than or equal to 25 nm, greater than or equal to 50 nm, greater than or equal to 100 nm, greater than or equal to 200 nm, greater than or equal to 300 nm, greater than or equal to 400 nm, greater than or equal to 500 nm, greater than or equal to 600 nm, greater than or equal to 700 nm, greater than or equal to 800 nm, greater than or equal to 900 nm, greater than or equal to 1,000 nm, greater than or equal to 2,000 nm, greater than or equal to 3,000 nm, greater than or equal to 4,000 nm, greater than or equal to 5,000 nm, greater than or equal to 7,500 nm, greater than or equal to 10,000 nm, greater than or equal to 15,000 nm, greater than or equal to 20,000 nm, greater than or equal to 25,000 nm, or greater. In some embodiments, the thickness of each layer may be less than or equal to 25,000 nm, less than or equal to 20,000 nm, less than or equal to 15,000 nm, less than or equal to 10,000 nm, less than or equal to 7,500 nm, less than or equal to 5,000 nm, less than or equal to 4,000 nm, less than or equal to 3,000 nm, less than or equal to 2,000 nm, less than or equal to 1,000 nm, less than or equal to 950 nm, less than or equal to 850 nm, less than or equal to 750 nm, less than or equal to 650 nm, less than or equal to 550 nm, less than or equal to 450 nm, less than or equal to 350 nm, less than or equal to 250 nm, less than or equal to 150 nm, less than or equal to 50 nm, less than or equal to 25 nm, less than or equal to 10 nm, less than or equal to 5 nm, or less.

In some embodiments, the thickness of at least one layer having a relatively high refractive index (e.g., high index layers 352, 356, 372, 376) may be less than or equal to the thickness of an adjacent layer having a relatively low refractive index/indices. In some embodiments, a ratio of the thickness of a layer having a relatively low index to the thickness of an adjacent layer having a relatively high index may range from about 50:1 to about 1:1—including all sub-ranges or values therebetween. For example, in some embodiments, the ratio of the thickness of the layer having the relatively low index to the thickness of the adjacent layer having the relatively high index may be less than or equal to 50:1, less than or equal to 25:1, less than or equal to 10:1, less than or equal to 9:1, less than or equal to 8:1, less than or equal to 7:1, less than or equal to 6:1, less than or equal to 5:1, less than or equal to 4:1, less than or equal to 3:1, less than or equal to 2:1, less than or equal to 1:1, or less. In some embodiments, the ratio of the thickness of the layer having the relatively low index to the thickness of the adjacent layer having the relatively high index may be greater than or equal to 1:1, greater than or equal to 2:1, greater than or equal to 3:1, greater than or equal to 4:1, greater than or equal to 5:1, greater than or equal to 6:1, greater than or equal to 7:1, greater than or equal to 8:1, greater than or equal to 9:1, greater than or equal to 10:1, greater than or equal to 20:1, greater than or equal to 40:1, or greater. In some embodiments, the thickness of at least one layer having a relatively high refractive index (e.g., high index layers 352, 356, 372, 376) may be greater than or equal to the thickness of an adjacent layer having a relatively low refractive index/indices.

In some embodiments, the thickness of each coating 340, 360 may be greater than or equal to 1 nm and less than or equal to 50,000 nm—including all sub-ranges or values therebetween. For example, in some embodiments, the thickness of each coating 340, 360 may be greater than or equal to 1 nm, greater than or equal to 10 nm, greater than or equal to 100 nm, greater than or equal to 500 nm, greater than or equal to 1,000 nm, greater than or equal to 2,000 nm, greater than or equal to 3,000 nm, greater than or equal to 4,000 nm, greater than or equal to 5,000 nm, greater than or equal to 6,000 nm, greater than or equal to 7,000 nm, greater than or equal to 8,000 nm, greater than or equal to 9,000 nm, greater than or equal to 10,000 nm, greater than or equal to 12,000 nm, greater than or equal to 14,000 nm, greater than or equal to 16,000 nm, greater than or equal to 18,000 nm, greater than or equal to 20,000 nm, greater than or equal to 30,000 nm, greater than or equal to 40,000 nm, or greater. In some embodiments, the thickness of each coating 340, 360 may be less than or equal to 50,000 nm, less than or equal to 40,000 nm, less than or equal to 30,000 nm, less than or equal to 20,000 nm, less than or equal to 19,000 nm, less than or equal to 17,000 nm, less than or equal to 15,000 nm, less than or equal to 13,000 nm, less than or equal to 11,000 nm, less than or equal to 10,000 nm, less than or equal to 9,000 nm, less than or equal to 8,000 nm, less than or equal to 7,000 nm, less than or equal to 6,000 nm, less than or equal to 5,000 nm, less than or equal to 4,000 nm, less than or equal to 3,000 nm, less than or equal to 2,000 nm, less than or equal to 1,000 nm, less than or equal to 500 nm, less than or equal to 100 nm, less than or equal to 10 nm, or less.

Depending on the configuration of the guiding component 310, the thickness $T_1$ of the guiding component 310 may be a combination of the thickness $T_2$ of the core 330 and the thickness $T_3$ of the exterior coating 340 (such as shown in FIG. 3A), a combination of the thickness $T_2$ of the core 330, the thickness $T_3$ of the exterior coating 340, and the thickness $T_4$ of the interior coating 360 (such as shown in FIG. 3B), or a combination of the thickness $T_2$ of the core 330 and the thickness $T_4$ of the interior coating 360 (such as shown in FIG. 3C).

In some embodiments, the thickness $T_1$ of the guiding component 310 may be greater than or equal to 5 μm and less than or equal to 2,000 μm—including all sub-ranges or values therebetween. For example, in some embodiments, the thickness $T_1$ of the guiding component 310 may be greater than or equal to 5 μm and less than or equal to 2,000 μm, greater than or equal to 25 μm and less than or equal to 1,000 μm, greater than or equal to 25 μm and less than or equal to 400 μm, greater than or equal to 25 μm and less than or equal to 200 μm, greater than or equal to 25 μm and less than or equal to 100 μm, greater than or equal to 25 μm and less than or equal to 75 μm, or greater than or equal to 25 and less than or equal to 50 μm. In some embodiments, the thickness $T_1$ of the guiding component 310 may be greater than or equal to 5 μm, greater than or equal to 25 μm, greater than or equal to 50 μm, greater than or equal to 100 μm, greater than or equal to 200 μm, greater than or equal to 400 μm, greater than or equal to 600 μm, greater than or equal to 800 μm, greater than or equal to 1,000 μm, greater than or equal to 1,500 μm, or greater than or equal to 2,000 μm. In some embodiments, the thickness $T_1$ of the guiding component 310 may be less than or equal to 2,000 μm, less than or equal to 1,500 μm, less than or equal to 1,000 μm, less than or equal to 900 μm, less than or equal to 700 μm, less than or equal to 500 μm, less than or equal to 300 μm, less than or equal to 100 μm, less than or equal to 75 μm, less than or equal to 50 μm, or less than or equal to 25 μm.

The various exemplary waveguides 300 described herein may be incorporated into an optical device, such as the optical head-mounted display device 100 described above. Depending on the design of the device, in some embodiments, light may be coupled into the guiding component 310 of the waveguide 300 by an in-coupler, such as the in-coupler 130 discussed above, through the first major surface 312 of the guiding component 310 at a first location, and after cycles of total internal reflection within the core 330, the reflected light may be coupled out of the guiding component 310 through the first major surface 312 of the guiding component 310 by an out-coupler, such as the out-coupler 140 discussed above, at a second location away from the first location. In some embodiments, light may be coupled into the guiding component 310 through the second major surface 314 of the guiding component 310 at a first location and then coupled out of the second major surface 314 of the guiding component 310 at a second location after cycles of total internal reflection. In some embodiments, light may be coupled into the guiding component 310 through one of the first and second major surfaces 312, 314 and then coupled out of the guiding component 310 through the other, opposite one of the first and second major surfaces 312, 314 after cycles of total internal reflection. In some embodiments, light may be coupled into the guiding component 310 through an edge surface extending between the first and second major surfaces 312, 314 and then coupled out of the guiding component 310 through the opposite edge surface extending between the first and second major surfaces 312, 314 after cycles of total internal reflection. Depending on the configuration of the in-coupler and/or out-coupler, light may be coupled into the guiding component 310 through any one of the first major surface 312, the second major surface 314, or one of the edge surfaces and then coupled out of the guiding component 310 through any one of the first major surface 312, the second major surface 314, or the other one of the edge surfaces after cycles of total internal reflection.

In some embodiments, when incorporated into the optical head-mounted device 100, the waveguide 300 may be configured such that the substrate 320 of the waveguide 300 and the user's eye may be positioned on the same side of the core 330 during operation. In some embodiments, the substrate 320 of the waveguide 300 and the user's eye may be positioned on opposite sides of the core 330 during operation. Although an exemplary optical head-mounted display 100, such as an AR, VR, or MR device, is described as an exemplary device which may incorporate the waveguides described herein, applications of the waveguides described herein are not limit to such. The waveguides described herein may be used in any devices or components for wave propagation, such as the case in which an image may be transported via the waveguide.

The various exemplary waveguides described herein with a coating disposed on at least one of the major surfaces of the core of the waveguide may be utilized to increase modal densities which may in turn enhance the resolution of the image transported by the waveguide as discussed in more detail below.

Figure 4:
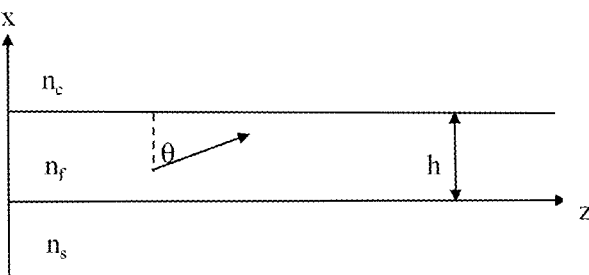
FIG. 4 schematically illustrates the geometry of a simplified planar waveguide.

As discussed above, only certain modes of propagation can be supported by a waveguide. FIG. 4 schematically illustrates the geometry of a simplified planar waveguide having a core, a cover and a substrate disposed on opposite sides of the core. The cover may refer to air for a bare, uncoated core. The core has a thickness h, and the refractive indices of the cover, core, and substrate are denoted as $n_c$, $n_f$, and $n_s$, respectively. Both $n_c$ and $n_s$ are less than $n_f$. The angle, $\theta$, is measured relative to the normal to the interfaces, i.e., the angle between the direction of the travel inside the core and the normal to the major surfaces of the core. The allowed modes of the waveguide structure shown in FIG. 4 must satisfy Maxwell's equations and the resulting wave equation. The allowed modes also satisfy the following dispersion relation:

$$\kappa_f h - \phi_c - \phi_s = m\pi \tag{1}$$

where $\kappa_f = n_f k \cos\theta$, $k = 2\pi/\lambda$, and m is an integer, which specifies the particular mode, i.e., $m^{th}$ mode (also referred to as mode number m), that is associated with the incidence angle $\theta$. $\phi_c$ represents the phase change on reflection from the interface between the core and the cover, and $\phi_s$ represents the phase change on reflection from the interface between the core and the substrate. The value of each phase change $\phi_c$, $\phi_s$ depends on the polarization (transverse electric (TE) or transverse magnetic (TM)) of the incident light.

Figure 5:
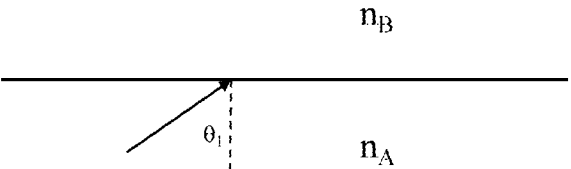
FIG. 5 schematically illustrates light traveling in a medium and incident on an interface between two media.

FIG. 5 schematically illustrates light traveling in medium A and incident on the interface between medium A and medium B at an angle, $\theta_1$, which is greater than the critical angle. The refractive indices of medium A and medium B are $n_A$ and $n_B$, respectively, with $n_A > n_B$. Medium A may refer to the core in the structure of FIG. 4, and medium B may refer to either the cover or the substrate in the structure of FIG. 4.

The phase change on reflection for transverse electric (TE) polarization, $\varphi_{TE}$, is given by:

$$\tan\varphi_{TE} = \frac{\sqrt{n_A^2 \sin^2\theta_1 - n_B^2}}{n_A \cos\theta_1} \tag{2}$$

and the variation of this phase change with respect to incidence angle, $\theta_1$, is given by:

$$\frac{d\varphi_{TE}}{d\theta_1} = \frac{n_A \sin\theta_1}{\sqrt{n_A^2 \sin^2\theta_1 - n_B^2}} \tag{3}$$

For transverse magnetic (TM) polarization, the phase change, $\varphi_{TM}$, on reflection is given by:

$$\tan\varphi_{TM} = \frac{n_A^2}{n_B^2} \frac{\sqrt{n_A^2 \sin^2\theta_1 - n_B^2}}{n_A \cos\theta_1} \tag{4}$$

and the variation of this phase change with respect to incidence angle, $\theta_1$, is given by:

$$\frac{d\varphi_{TM}}{d\theta_1} = \left[ \frac{n_B^2}{n_B^4 \cos^2\theta_1 + n_A^4 \sin^2\theta_1 - n_A^2 n_B^2} \right]\left[ \frac{n_A \sin\theta_1 (n_A^2 - n_B^2)}{\sqrt{n_A^2 \sin^2\theta_1 - n_B^2}} \right] \tag{5}$$

By applying a coating, in particular the multilayer coating stack described herein, to at least one major surface of the core, the variation in phase change with respect to the incidence angle, $$\frac{d\varphi_{TE}}{d\theta_1}$$

and/or $$\frac{d\varphi_{TM}}{d\theta_1},$$

on reflection by the coated surface may be increased. In other words, greater (in magnitude)

$$\frac{d\varphi_{TE}}{d\theta_1}$$

(or stated differently, greater absolute value of $$\frac{d\varphi_{TE}}{d\theta_1}, \text{ i.e., } \left|\frac{d\varphi_{TE}}{d\theta_1}\right|)$$

and/or greater (in magnitude)

$$\frac{d\varphi_{TM}}{d\theta_1}$$

(or stated differently, greater absolute value of $$\frac{d\varphi_{TM}}{d\theta_1}, \text{ i.e., } \left|\frac{d\varphi_{TM}}{d\theta_1}\right|)$$

may be achieved when the multilayer coating stack described herein may be incorporated in the waveguide. By applying the multilayer coating stack described herein to the major surface of the core facing the cover (such as the coating 340 in the exemplary waveguide shown in FIGS. 3A and 3B) and/or applying the multilayer coating stack described herein to the major surface of the core facing the substrate (such as the coating 360 in the exemplary waveguide shown in FIGS. 3B and 3C), the interface between the core and the cover and/or the interface between the core and the substrate may be altered such that the variation in phase change with respect to the incidence angle upon reflection from the interface can be increased and a smaller angular change is needed to satisfy equation (1) above, which in turn increases the quantity of modes that can be propagated by the waveguide and the density of the modes that are propagated by the waveguide, thereby improving the resolution of the optical device, such as an optical head-mounted display device incorporating such waveguide. The waveguide design described herein, for example, the coating design described herein, may be configured to only densify certain ranges of modes or the entire range of modes.

The increased phase change with respect to the incidence angle in the transverse electric (TE) mode, i.e., greater $$\left|\frac{d\varphi_{TE}}{d\theta_1}\right|,$$

and/or increased phase change with respect to the incidence angle in the transverse (TM) mode, i.e., greater $$\left|\frac{d\varphi_{TM}}{d\theta_1}\right|,$$

may further lead to increased phase change with respect to incidence angle on reflection from the interface between the core and the cover, i.e., greater (in magnitude)

$$\frac{d\phi_c}{d\theta}$$

or greater $$\left|\frac{d\phi_c}{d\theta}\right|,$$

and/or increased phase change with respect to incidence angle on reflection from the interface between the core and the substrate, i.e., greater (in magnitude)

$$\frac{d\phi_s}{d\theta}$$

or greater $$\left|\frac{d\phi_s}{d\theta}\right|.$$

In other words, greater (in magnitude)

$$\frac{d\phi_c}{d\theta}$$

(or greater $$\left|\frac{d\phi_c}{d\theta}\right|)$$

and/or greater (in magnitude)

$$\frac{d\phi_s}{d\theta}$$

(or greater $$\left|\frac{d\phi_s}{d\theta}\right|)$$

may be achieved when the multilayer coating stack described herein may be incorporated in the waveguide.

In some embodiments, a ratio of the value of $$\left|\frac{d\phi_c}{d\theta}\right|_{coated}$$

associated with a core-cover interface modified by the multilayer coating stack described herein (such as the coating stack 340) to the value of $$\left|\frac{d\phi_c}{d\theta}\right|_{coated}$$

associated with an uncoated, bare core-cover interface, i.e., the ratio of $$\left|\frac{d\phi_c}{d\theta}\right|_{coated} to \left|\frac{d\phi_c}{d\theta}\right|_{uncoated},$$

may be greater than 1 and less than or equal to 50—including all sub-ranges or values therebetween. In some embodiments, the ratio of $$\left|\frac{d\phi_c}{d\theta}\right|_{coated} to \left|\frac{d\phi_c}{d\theta}\right|_{uncoated},$$

may be greater than or equal to 5, greater than or equal to 10, greater than or equal to 20, greater than or equal to 30, greater than or equal to 40, greater than or equal to 50, or greater.

In some embodiments, a ratio of the value of $$\left|\frac{d\phi_s}{d\theta}\right|_{coated}$$

associated with a core-substrate interface modified by the multilayer coating stack described herein (such as the coating stack 360) to the value of $$\left|\frac{d\phi_s}{d\theta}\right|_{uncoated}$$

associated with an uncoated core-substrate interface, i.e., the ratio of $$\left|\frac{d\phi_s}{d\theta}\right|_{coated} to \left|\frac{d\phi_s}{d\theta}\right|_{uncoated},$$

may be greater than 1 and less than or equal to 50—including all sub-ranges or values therebetween. In some embodiments, the ratio of $$\left|\frac{d\phi_s}{d\theta}\right|_{coated} to \left|\frac{d\phi_s}{d\theta}\right|_{uncoated}$$

may be greater than or equal to 5, greater than or equal to 10, greater than or equal to 20, greater than or equal to 30, greater than or equal to 40, greater than or equal to 50, or greater.

Depending on the specific multilayer coating stack configuration, the greater $$\left|\frac{d\phi_c}{d\theta}\right|_{coated}$$

and/or greater $$\left|\frac{d\phi_s}{d\theta}\right|_{coated}$$

may be achieved over one or more or a range of incidence angles between the critical angle $\theta_{critical}$ of the core and $90°$, such as between $\theta_{critical}$ and $\theta_{critical}+\delta$, where $\delta$ may be $5°$, $10°$, $20°$, $30°$, $40°$, . . . , up to $(90°-\theta_{critical})$.

EXAMPLES

The following examples describe various features and advantages provided by the disclosure, and are in no way intended to limit the invention and appended claims.

Two waveguides, example 1 and example 2, were studied by modeling. Example 1 includes a structure similar to that shown in FIG. 2. Example 1 includes a high index ($n_1$=2.0) core with no coating disposed on a low index ($n_2$=1.5) substrate. Example 2 includes a structure similar to that shown in FIG. 3A. Example 2 includes a high index ($n_1$=2.0) core disposed on a low index ($n_2$=1.5) substrate and a six-layer coating disposed on the core and opposite to the substrate. The six-layer coating includes three high index layers and three low index layers arranged in an alternating matter. Table 1 below sets forth the designs of examples 1 and 2.

TABLE 1

| | Ex. 1 | | | Ex. 2 | | |
|---|---|---|---|---|---|---|
| | Layer # | Thickness (μm) | Index at 632.8 nm | Layer # | Thickness (μm) | Index at 632.8 nm |
| Coating | — | 0 | — | 1 | 0.066 | 2.0 |
| | | | | 2 | 0.947 | 1.6 |
| | | | | 3 | 0.063 | 2.0 |
| | | | | 4 | 0.818 | 1.6 |
| | | | | 5 | 0.555 | 2.0 |
| | | | | 6 | 0.060 | 1.6 |
| Core | — | 50 | 2.0 | — | 47.492 | 2.0 |
| Combined Thickness (μm) | | 50 | | | 50 | |

It should be noted that the thickness of the core in example 2 is less than the thickness of the core in example 1 by an amount equal to the thickness of the six-layer coating in example 2. In other words, the combined thickness of the core and the coating of example 2 is 50 μm and is the same as the thickness of the bare core of example 1 without any coating.

Figure 6:
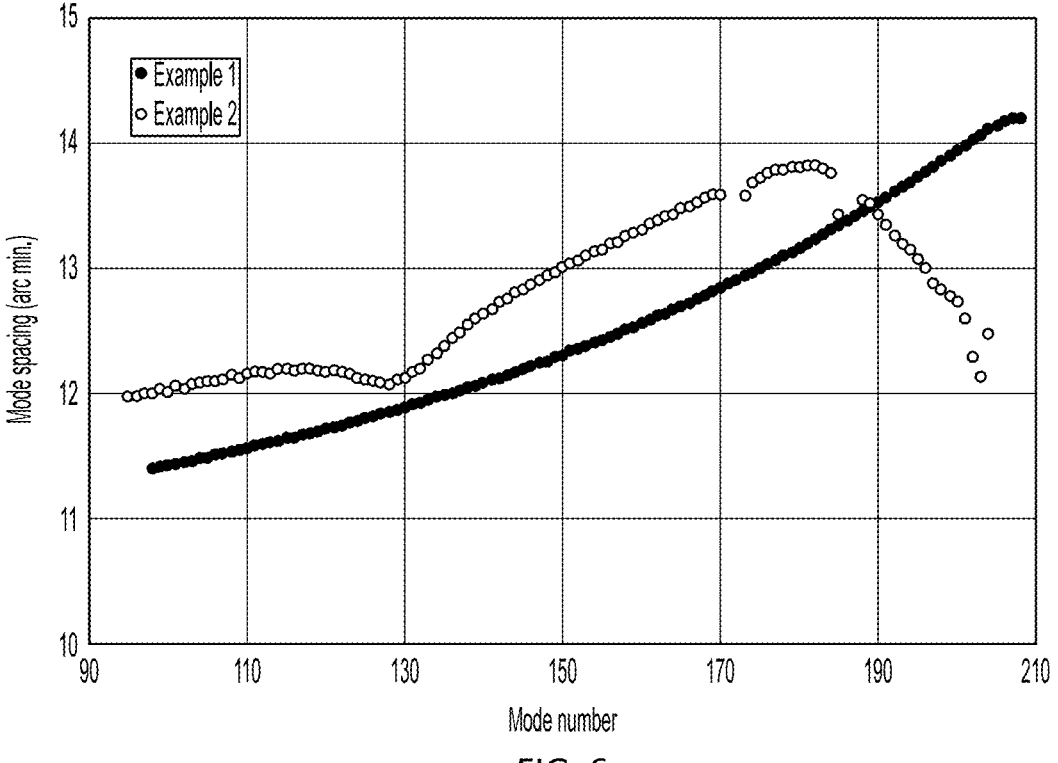
FIG. 6 shows modeled mode spacing for waveguides as a function of mode number.

FIG. 6 shows the modeled mode spacing within the core for example 1 (bare core) and example 2 (coated core), respectively, bound by air on one side and by the substrate on the opposite side and operating at a wavelength of 0.6328

µm. The modeled result is based on transverse electric (TE) modes propagating in the waveguide. It should be noted that the operating wavelength of 0.6328 µm was chosen for purpose of illustration and not intended to be limiting. The various exemplary waveguides described herein can be designed for operating at any other suitable wavelengths to achieve increased modal densities. Also, although transverse electric (TE) mode propagation was modeled for purpose of illustration, the various exemplary waveguides described herein can also be designed for transverse magnetic (TM) mode propagation and/or a combination of transverse electric (TE) mode and transverse magnetic (TM) mode propagation.

It should be noted that of all the modes that can be supported by the waveguides of examples 1 and 2, only a subset is shown in FIG. 6. This is because of all the modes supported by any waveguide, only a subset is usable in a grating-based AR, VR, or MR device incorporating such waveguide in order to prevent banding (i.e., dropouts in the augmented image). Specifically, in order to prevent banding, a maximum angle of incidence allowable, $\theta_{pmax}$, needs to be determined. This requirement means that only modes above a certain mode number can be used by the grating-based device. In the modeled examples, $\theta_{pmax}$ has been set to be equal to 72°, which means that out of all the allowed modes, only those above mode number 97 (or 97$^{th}$ mode) may be utilized for a grating-based device, which are shown in FIG. 6.

As shown in FIG. 6, the higher order modes have greater mode spacing within the waveguide of example 1. As also shown in FIG. 6, the waveguide of example 2 allows at least the high order modes (mode number >190) to have reduced mode spacing (which translates into increased modal density and increased number of modes transported by the waveguide that would provide improved image resolution), as compared to the waveguide of example 1 with no coating. Furthermore, it is expected that different multilayer coating designs, such as coatings with higher layer counts, will enable a further decrease in mode spacing for all of the usable modes.

Figure 7:
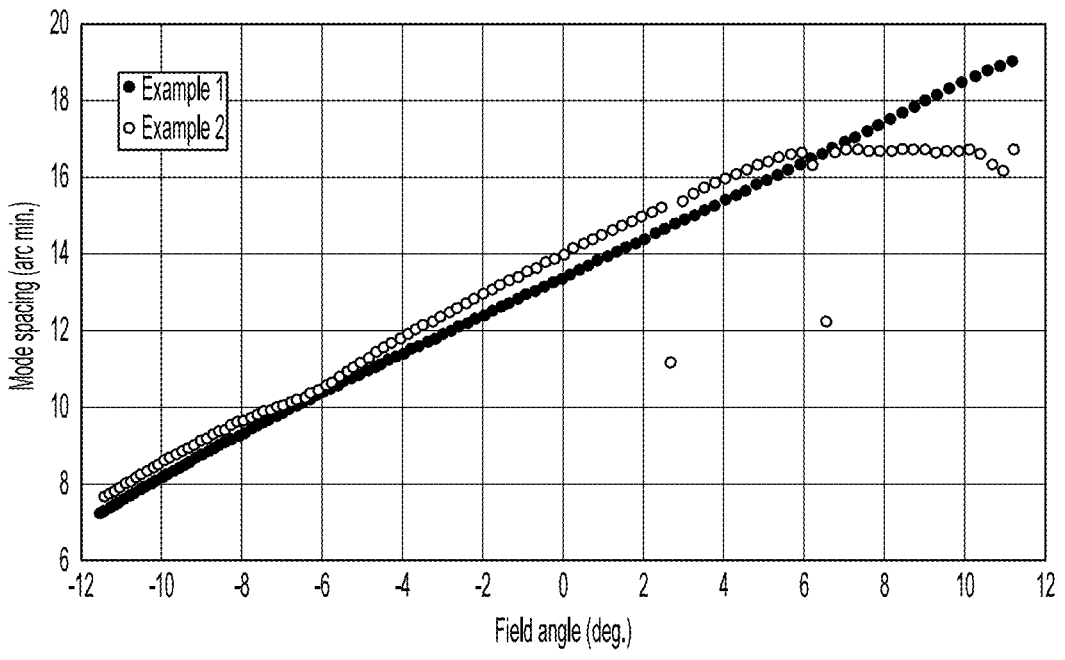
FIG. 7 shows modeled mode spacing of a grating-based device as a function of field angle.

FIG. 7 shows the modeled mode spacing as a function of the field of view (FOV) angle of all of the modes of FIG. 6 after out coupling using an out-coupling grating that has the same period as the in-coupling grating and assuming a symmetric field of view (FOV). As shown, the waveguide of example 1 demonstrates the poorest mode spacing of 19.0 arc minutes near a field angle of 11.5°. The waveguide of example 2 allows the mode spacing at the same field angle to be reduced to 16.8 arc minutes. It is expected that different multilayer coating designs will improve the mode spacing across the entire FOV.

As described above, with a coating applied to at least one of the major surfaces of a high index core of the waveguide, the interface between the core and the cover and/or the interface between the core and the substrate may be altered such that the variation in phase change with respect to the incidence angle upon reflection from the interface can be increased, which in turn increases the quantity of modes that can be propagated by the waveguide and the density of the modes that are propagated by the waveguide, thereby improving the resolution of the optical device, such as an optical head-mounted display device incorporating such waveguide. reduced mode spacing and increased mode densities can be achieved. Accordingly, a thinner core may be utilized while still achieving comparable or even better resolution and preserving the fidelity of the image as compared to waveguides with a thicker core that has no coating.

The reduction in the thickness of the high index core, coupled with the use of the low index substrate, can facilitate weight reduction of the device (e.g., AR headset) incorporating such waveguide. In addition, the use of lower index materials, such as the low index substrate, can reduce the cost of the waveguide as compared with high index alternatives.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A device for projecting a virtual-or augmented-reality image, the device comprising:

a waveguide; and an in-coupler directing light into the waveguide such that the light is propagated through the waveguide via total internal reflection;

wherein the waveguide comprises:

a core;

a substrate having a thickness greater than or equal to 20 µm and less than or equal to 600 µm; and a stack of thin films overlaying a surface of the core, wherein:

the stack comprises at least three thin films overlaying one another in the stack;

the stack has a thickness less than 50 µm;

a refractive index of at least one of the thin films differs from that of the core;

adjacent thin films have different refractive indices from one another; and the stack of thin films is configured to satisfy one of the following:

wherein the stack of thin films overlays a first major surface of the core, wherein the substrate is disposed on a second major surface of the core opposite the first major surface of the core, and wherein $$\left|\frac{d\phi_c}{d\theta}\right|$$

is greater relative to that of the core without the stack of thin films over one or more or a range of incidence angles between the critical angle $\theta_{critical}$ of the core and 90°, where q is an incidence angle of the light propagating inside the core of the waveguide via total internal reflection, and $\phi_c$ represents a phase change of the light upon reflection from the first major surface of the core; or wherein the stack of thin films overlays the second major surface of the core, and wherein the stack of thin films is disposed between the core and the substrate, $$\left|\frac{d\phi_s}{d\theta}\right|$$

is greater relative to that of the core without the stack of thin films over one or more or a range of incidence angles between the critical angle $\theta_{critical}$ of the core and 90°, where $\emptyset_s$ represents a phase change of the light upon reflection from the second major surface of the core.

2. The device of claim 1, wherein the stack of thin films increases the density of modes of the light propagated through the waveguide relative to that of the core without the stack of thin films, and wherein the propagation of the light through the waveguide via total internal reflection satisfies the following:

$$\kappa_1 h - \emptyset_c - \emptyset_s = m\pi$$

where $\kappa_1 = n_1 k \cos \theta$, $n_1$ is the refractive index of the core, $k = 2\pi/\lambda$, $\lambda$ is the wavelength of the light, h is the thickness of the core, and m is an integer and specifies a mode number associated with the incidence angle $\theta$.

3. The device of claim 1, wherein the stack of thin films is configured such that:

when the light propagates in transverse electric (TE) mode, $$\left| \frac{d\emptyset_c}{d\theta} \right|$$

is greater than $$\left| \frac{n_1 \sin\theta}{\sqrt{n_1^2 \sin^2\theta - n_B^2}} \right|$$

over one or more or a range of incidence angles between the critical angle $\theta_{critical}$ of the core and 90°, where $n_1$ is the refractive index of the core, and $n_B$ represents a refractive index of a medium directly overlaying the stack of thin films; and/or when the light propagates in transverse magnetic (TM) mode, $$\left| \frac{d\emptyset_c}{d\theta} \right|$$

is greater than $$\left| \left[ \frac{n_B^2}{n_B^4 \cos^2\theta + n_1^4 \sin^2\theta - n_1^2 n_B^2} \right] \left[ \frac{n_1 \sin\theta (n_1^2 - n_B^2)}{\sqrt{n_1^2 \sin^2\theta - n_B^2}} \right] \right|$$

over one or more or a range of incidence angles between the critical angle $\theta_{critical}$ of the core and 90°.

4. The device of claim 1, wherein the stack of thin films is configured such that:

when the light propagates in transverse electric (TM) mode, $$\left| \frac{d\emptyset_s}{d\theta} \right|$$

is greater than $$\left| \frac{n_1 \sin\theta}{\sqrt{n_1^2 \sin^2\theta - n_s^2}} \right|$$

over one or more or a range of incidence angles between the critical angle $\theta_{critical}$ of the core and 90°, where $n_1$ is the refractive index of the core, and $n_s$ represents a refractive index of the substrate; and/or when the light propagates in transverse magnetic (TM) mode, $$\left| \frac{d\emptyset_s}{d\theta} \right|$$

is greater than $$\left| \left[ \frac{n_s^2}{n_s^4 \cos^2\theta + n_1^4 \sin^2\theta - n_1^2 n_s^2} \right] \left[ \frac{n_1 \sin\theta (n_1^2 - n_s^2)}{\sqrt{n_1^2 \sin^2\theta - n_s^2}} \right] \right|$$

over one or more or a range of incidence angles between the critical angle $\theta_{critical}$ of the core and 90°.

5. The device of claim 1, wherein the refractive index of the core is greater than or equal to 1.6.

6. The device of claim 1, wherein the stack comprises:

a first thin film overlaying the core and having a first refractive index that is less than the refractive index of the core;

a second thin film overlaying the first thin film and having a second refractive index that is greater than the first refractive index; and a third thin film overlaying the second thin film and having a third refractive index that is less than the second refractive index.

7. A head-mounted device, comprising:

a display;

a waveguide;

an in-coupler configured for coupling light emitted by the display into the waveguide at a first location of the waveguide such that the light is propagated through the waveguide via total internal reflection to a second location of the waveguide; and an out-coupler configured for coupling the light out of the waveguide at the second location of the waveguide and for projecting the light into a user's eye;

wherein the waveguide comprises:

a core comprising:

a first major surface, a second major surface opposite the first major surface, and a thickness defined by a distance between the first major surface and the second major surface, wherein the thickness of the core is less than or equal to 2,000 μm; and a coating comprising:

a thickness that is less than or equal to 50 μm;

a first layer disposed on the first major surface of the core and having a first refractive index that is different from the refractive index of the core; and a second layer disposed on the first layer and having a second refractive index that is different from the first refractive index of the first layer; and wherein the propagation of the light through the waveguide via total internal reflection satisfies the following: $\kappa_1 h - \emptyset_c - \emptyset_s = m\pi$, where $\kappa_1 = n_1 k \cos\theta$, $n_1$ is the refractive index of the core, $k = 2\pi/\lambda$, $\lambda$ is the wavelength of the light, $\theta$ is an incidence angle of the light propagating inside the core of the waveguide via internal reflection, h is the thickness of the core, $\emptyset_c$ represents a phase change of the light upon reflection from the first major surface of the core, and $\emptyset_s$ represents a phase change of the light upon reflection from the second major surface of the core, and m is an integer and specifies a mode number associated with the incidence angle $\theta$; and wherein the coating is configured such that $$\left|\frac{d\emptyset_c}{d\theta}\right|$$

is greater relative to that of the core without the coating over one or more or a range of incidence angles between the critical angle $\theta_{critical}$ of the core and 90°.

8. The head-mounted device of claim 7, wherein the coating is configured such that:

when the light propagates in transverse electric (TE) mode, $$\left|\frac{d\emptyset_c}{d\theta}\right|$$

is greater than $$\left|\frac{n_1 \sin\theta}{\sqrt{n_1^2 \sin^2\theta - n_B^2}}\right|$$

over one or more or a range of incidence angles between the critical angle $\theta_{critical}$ of the core and 90°, where $n_B$ represents a refractive index of a medium directly overlaying the coating; and/or when the light propagates in transverse magnetic (TM) mode, $$\left|\frac{d\emptyset_c}{d\theta}\right|$$

is greater than $$\left|\left[\frac{n_s^2}{n_B^4 \cos^2\theta + n_1^4 \sin^2\theta - n_1^2 n_B^2}\right]\left[\frac{n_1 \sin\theta(n_1^2 - n_B^2)}{\sqrt{n_1^2 \sin^2\theta - n_B^2}}\right]\right|$$

over one or more or a range of incidence angles between the critical angle $\theta_{critical}$ of the core and 90°.

9. The head-mounted device of claim 7, wherein the waveguide further comprises:

a substrate, wherein:

the core is disposed on a major surface of the substrate;

a refractive index of the substrate is less than the refractive index of the core; and the coating and the substrate are disposed on opposite sides of the core.

10. The head-mounted device of claim 9, wherein the coating disposed on the first major surface of the core is a first coating, the waveguide further comprising:

a second coating disposed on the second major surface of the core, wherein the second coating is configured such that $$\left|\frac{d\emptyset_s}{d\theta}\right|$$

is greater relative to that of the core without the second coating over one or more or a range of incidence angles between the critical angle $\theta_{critical}$ of the core and 90°.

11. The head-mounted device of claim 10, wherein the second coating comprises a stack of thin films having a thickness less than 50 µm, and wherein adjacent thin films have different refractive indices from one another.

12. The head-mounted device of claim 10, wherein the second coating is configured such that:

when the light propagates in transverse electric (TE) mode, $$\left|\frac{d\emptyset_s}{d\theta}\right|$$

is greater than $$\left|\frac{n_1 \sin\theta}{\sqrt{n_1^2 \sin^2\theta - n_s^2}}\right|$$

over one or more or a range of incidence angles between the critical angle $\theta_{critical}$ of the core and 90°, where $n_s$ represents a refractive index of the substrate; and/or when the light propagates in transverse magnetic (TM) mode, $$\left|\frac{d\emptyset_s}{d\theta}\right|$$

is greater than $$\left|\left[\frac{n_s^2}{n_s^4 \cos^2\theta + n_1^4 \sin^2\theta - n_1^2 n_s^2}\right]\left[\frac{n_1 \sin\theta(n_1^2 - n_2^2)}{\sqrt{n_1^2 \sin^2\theta - n_s^2}}\right]\right|$$

over one or more or a range of incidence angles between the critical angle $\theta_{critical}$ of the core and 90°.

13. The head-mounted device of claim 7, wherein:

the refractive index of the core is greater than the first refractive index of the first layer of the coating; and the second refractive index of the second layer is greater than the first refractive index of the first layer of the coating.

14. A waveguide for transporting a virtual-or augmented-reality image, comprising:

a core comprising:

a first major surface, a second major surface opposite the first major surface, and a thickness defined by a distance between the first major surface and the second major surface, wherein the thickness of the core is greater than or equal to 5 μm to 2,000 μm; and a coating disposed on the first major surface of the core, wherein the coating comprises:

a first layer disposed on the first major surface of the core and having a first refractive index less than or equal to 1.6 and different from the refractive index of the core;

a second layer disposed on the first layer and having a second refractive index that is greater than or equal to 1.6 and different from the first refractive index of the first layer;

a third layer disposed on the second layer and having a third refractive index that is less than or equal to 1.6 and different from the second refractive index of the second layer; and a thickness that is greater than or equal to 1 nm and less than or equal to 50 μm;

wherein propagation of light through the waveguide via total internal reflection satisfies the following:

$$\kappa_1 h - \phi_c - \phi_s = m\pi$$

where $k_1 = n_1 k \cos\theta$, $n_1$ is the refractive index of the core, $k = 2\pi/\lambda$, $\lambda$ is the wavelength of the light, $\theta$ is an incidence angle of the light propagating inside the core of the waveguide via internal reflection, h is the thickness of the core, $\phi_c$ represents a phase change of the light upon reflection from the first major surface of the core, and $\phi_s$ represents a phase change of the light upon reflection from the second major surface of the core, and m is an integer and specifies a mode number associated with the incidence angle $\theta$; and wherein the coating is configured such that $$\left| \frac{d\phi_c}{d\theta} \right|$$

is greater relative to that of the core without the coating over one or more or a range of incidence angles between the critical angle $\theta_{critical}$ of the core and 90°.

15. The waveguide of claim 14, wherein the coating is configured such that:

when the light propagates in transverse electric (TE) mode, $$\left| \frac{d\phi_c}{d\theta} \right|$$

is greater than $$\left| \frac{n_1 \sin\theta}{\sqrt{n_1^2 \sin^2\theta - n_B^2}} \right|$$

over one or more or a range of incidence angles between the critical angle $\theta_{critical}$ of the core and 90°, where $n_B$ represents a refractive index of a medium directly overlaying the coating; and/or when the light propagates in transverse magnetic (TM) mode, $$\left| \frac{d\phi_c}{d\theta} \right|$$

is greater than $$\left| \left[ \frac{n_B^2}{n_B^4 \cos^2\theta + n_1^4 \sin^2\theta - n_1^2 n_B^2} \right] \left[ \frac{n_1 \sin\theta (n_1^2 - n_B^2)}{\sqrt{n_1^2 \sin^2\theta - n_B^2}} \right] \right|$$

over one or more or a range of incidence angles between the critical angle $\theta_{critical}$ of the core and 90°.

16. The waveguide of claim 14, wherein the coating disposed on the first major surface of the core is a first coating, the waveguide further comprises a second coating, wherein the first coating and the second coating are disposed on opposite sides of the core;

wherein the second coating comprises:

a first layer disposed on the second major surface of the core and having a first refractive index different from the refractive index of the core; and a second layer disposed on the first layer and having a second refractive index different from the first refractive index of the first layer;

wherein the second coating is configured such that $$\left| \frac{d\phi_s}{d\theta} \right|$$

is greater relative to that of the core without the second coating over one or more or a range of incidence angles between the critical angle $\theta_{critical}$ of the core and 90°.

17. The waveguide of claim 16, wherein the second coating is configured such that:

when the light propagates in transverse electric (TE) mode, $$\left| \frac{d\phi_s}{d\theta} \right|$$

is greater than $$\left| \frac{n_1 \sin\theta}{\sqrt{n_1^2 \sin^2\theta - n_s^2}} \right|$$

over one or more or a range of incidence angles between the critical angle $\theta_{critical}$ of the core and 90°, where $n_s$ represents a refractive index of a medium directly overlaying the second coating; and/or when the light propagates in transverse magnetic (TM) mode, $$\left| \frac{d\phi_s}{d\theta} \right|$$

is greater than $$\left\lVert \left[ \frac{n_s^2}{n_s^4\cos^2\theta + n_1^4\sin^2\theta - n_1^2 n_s^2} \right]\left[ \frac{n_1\sin\theta(n_1^2 - n_s^2)}{\sqrt{n_1^2\sin^2\theta - n_s^2}} \right] \right\rVert \qquad 5$$

over one or more or a range of incidence angles between the critical angle $\theta_{critical}$ of the core and 90°.

18. The waveguide of claim 14, further comprising at least 10 one of:

a substrate;

an in-coupler configured to couple light into the wave-guide; or an out-coupler configured to couple light out of the 15 waveguide;

wherein:

the substrate has a refractive index less than the refractive index of the core;

the substrate has a thickness greater than or equal to 20 20 μm and less than or equal to 1,500 μm;

the substrate comprises a plastic substrate or a glass substrate; and at least one of the in-coupler or the out-coupler comprises a grating.                 25

\* \* \* \* \*